Jan. 4, 1955         G. W. GARDNER         2,698,652
LEVER ACTUATED TIRE DISMOUNTING DEVICE
Filed Feb. 4, 1952                         4 Sheets-Sheet 1
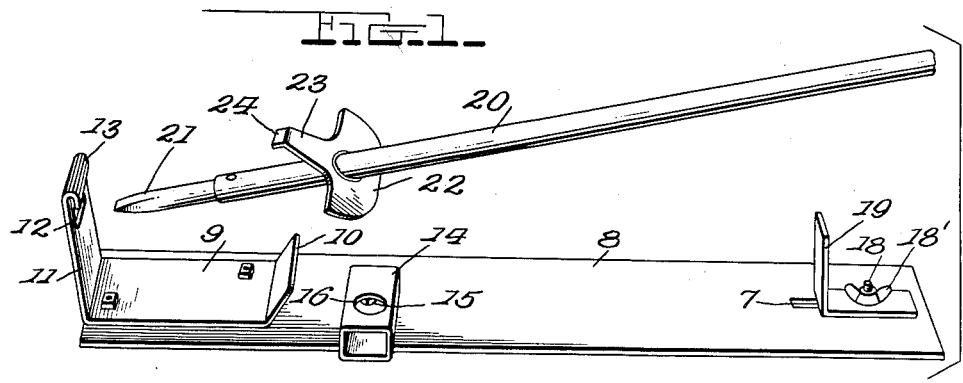
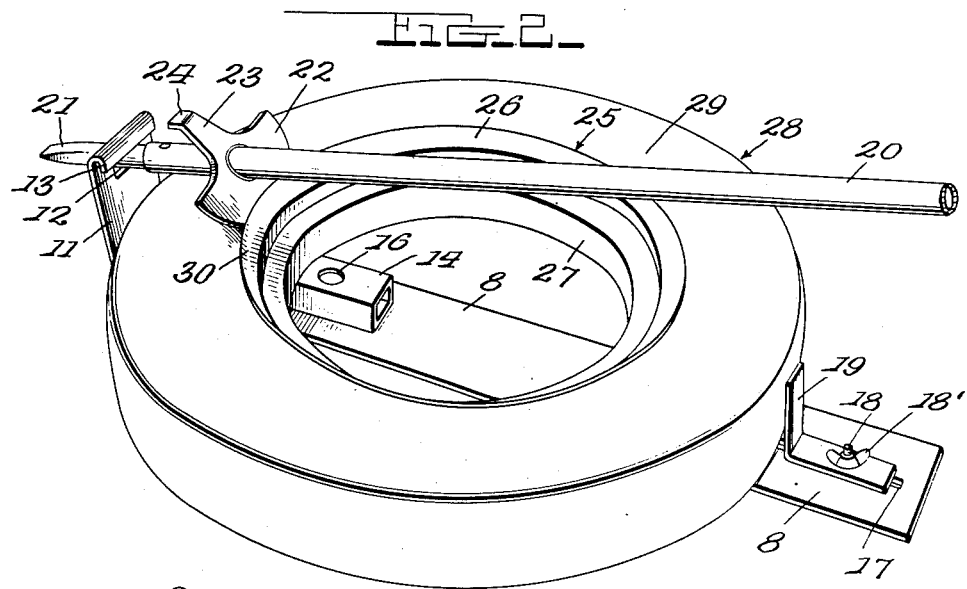
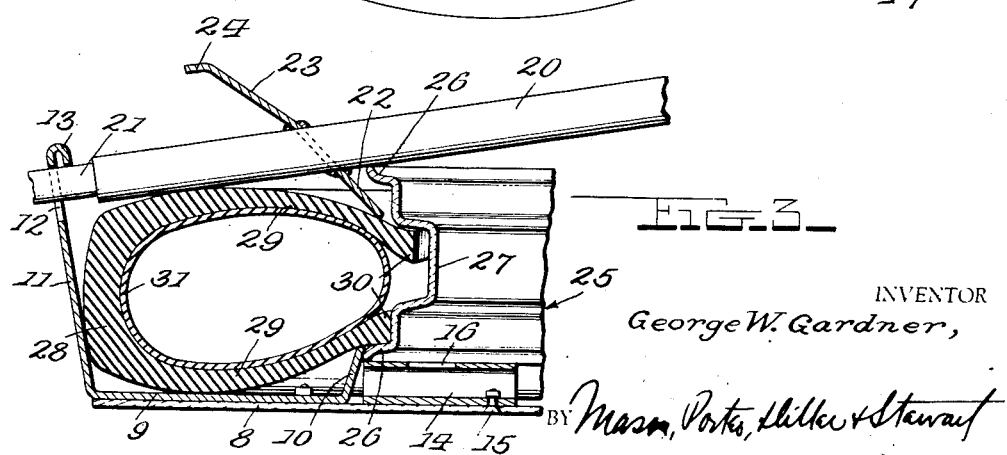
INVENTOR
George W. Gardner,
BY Mason, Porter, Miller & Stewart
ATTORNEYS Jan. 4, 1955             G. W. GARDNER             2,698,652
LEVER ACTUATED TIRE DISMOUNTING DEVICE
Filed Feb. 4, 1952                                        4 Sheets-Sheet 2
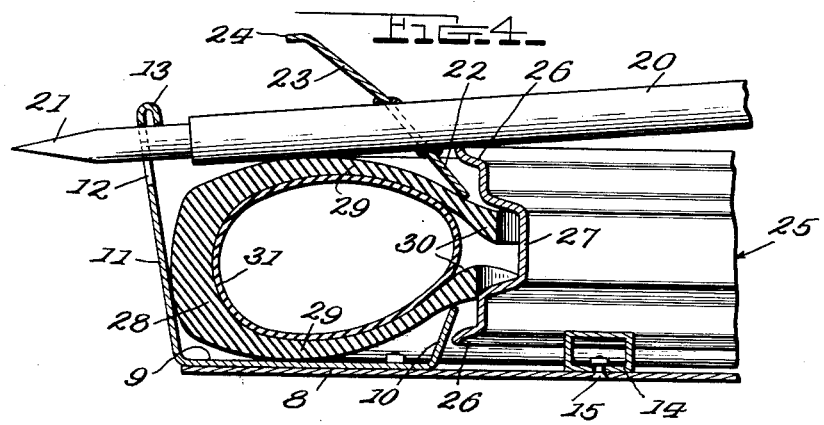
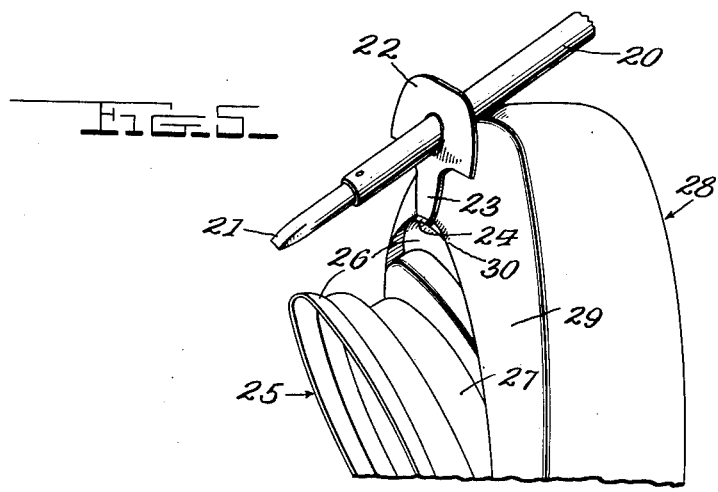
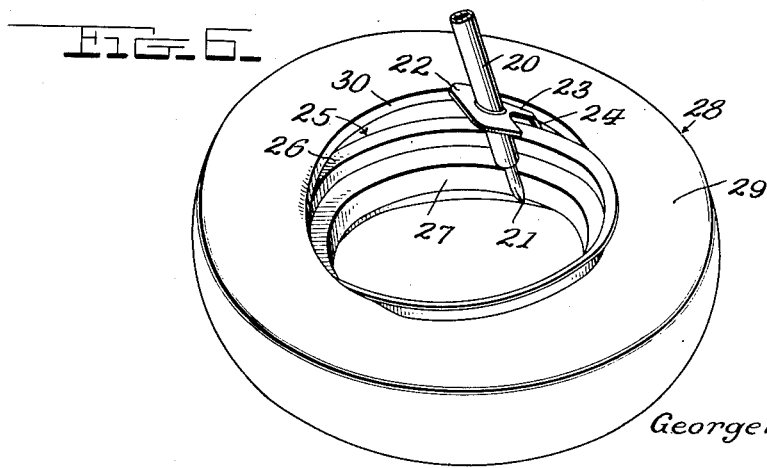
INVENTOR
George W. Gardner,
BY *Mason, Porter, Diller & Stewart*
ATTORNEYS Jan. 4, 1955 G. W. GARDNER 2,698,652
LEVER ACTUATED TIRE DISMOUNTING DEVICE
Filed Feb. 4, 1952 4 Sheets-Sheet 3

INVENTOR.
GEORGE W. GARDNER
BY James B. Christie
ATTORNEY

Jan. 4, 1955

G. W. GARDNER 2,698,652

LEVER ACTUATED TIRE DISMOUNTING DEVICE

Filed Feb. 4, 1952

INVENTOR.
GEORGE W. GARDNER
BY James B. Christie

ATTORNEY

United States Patent Office 2,698,652
Patented Jan. 4, 1955

2,698,652

LEVER ACTUATED TIRE DISMOUNTING DEVICE

George W. Gardner, El Monte, Calif.

Application February 4, 1952, Serial No. 269,801

5 Claims. (Cl. 157—1.28)

This invention relates to improved devices for dismounting pneumatic tires.

This application is a continuation-in-part of my co-pending application Serial No. 209,472 which was filed on February 5, 1951 and has since been abandoned.

Pneumatic tires which are mounted on wheels having rims with drop-centers and which are mounted on wheels having a split rim are difficult to dismount with ordinary hand tools. In accordance with my invention, I provide a readily transportable device with which such tires can be dismounted with ease.

One embodiment of the invention provides a tire dismounting device which is primarily suitable for dismounting tires which are mounted on conventional wheels having rims with drop-centers.

Another embodiment of the invention provides a tire dismounting device which may be employed either with tires mounted on conventional wheels having rims with drop-centers or with tires mounted on wheels having a locking arrangement for preventing the tire from escaping from the wheel in case the tire is used while deflated. Such wheels are commonly employed on military vehicles. The safety locking arrangement in such wheels is ordinarily a spacer which is located between the flanges of the wheel on which the tire is mounted. The rim of the wheel is divided into two parts which are bolted together so as to rigidly secure the beads of the tire between the spacer and the flanges on the rim of the wheel. Tires which are mounted on such split-rim type wheels are difficult to remove because the wheel does not have a drop-center. Conventional tire dismounting devices are not satisfactory for use with tires mounted on such wheels.

The invention is explained with reference to the drawings, in which:

Fig. 1 is a perspective view of one embodiment of the device as arranged for operation in dismounting a tire;

Fig. 2 is a perspective view showing the device of Fig. 1 supporting a tire and the wheel rim during the initial operation of breaking away one tire bead from the rim;

Fig. 3 is a vertical section of the device of Fig. 1 during the above operation, taken along the axis of the operating tool;

Fig. 4 is a similar vertical cross-section of the device of Fig. 1 showing the second step of operation in which the lower bead is separated from the flange of the rim;

Fig. 5 is a perspective view showing the tool disclosed in Fig. 1 as used in lifting one tire bead over the flange on the opposite side of the rim;

Fig. 6 is a perspective view showing the use of the tool disclosed in Fig. 1 in lifting the tire bead over the nearer flange of the rim;

Figure 7:
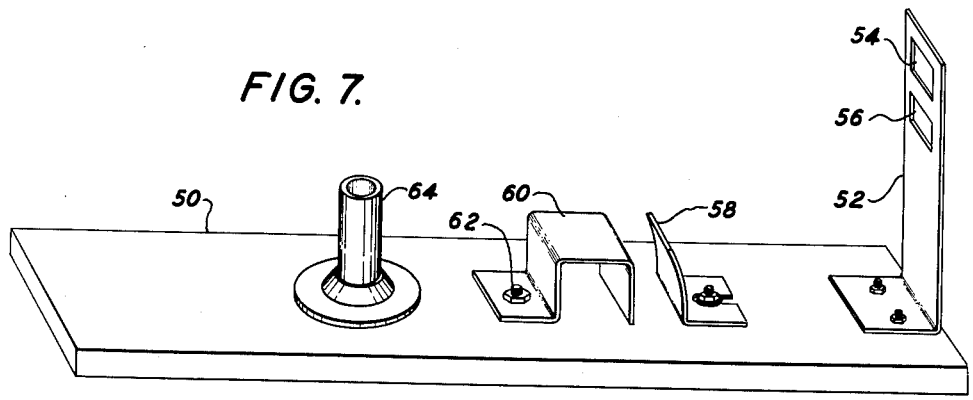
Fig. 7 is a perspective view of another embodiment of the tire dismounting device.

Briefly described, the device shown in Fig. 1 consists essentially of two parts, a support for the wheel rim and tire which is to be removed, and a tool cooperating with the support for easy and prompt separation of the tire from the rim in successive operating steps.

As illustrated, I have shown the device to include a base 8 in the form of a flat relatively broad strip of rigid material, such as steel or the like. At one end, the base 8 carries a plate 9, the ends of which are bent upwardly. The plate 9 is bolted, riveted, welded or otherwise attached on the upper face of the base 8. The inner end of the plate is bent up to form a ridge 10. This ridge forms an extended blunt edge upon which a side wall of the tire may rest.

The outer end of the plate 9 is similarly bent upwardly to form a vertical extension 11. This extension is apertured as shown at 12 to receive the tire dismounting tool and to form a fulcrum for it. The upper edge of the extension 11 is bent inwardly and downwardly to form a rib 13. This is a desirable reinforcement for the extension when it serves as a fulcrum.

On the upper surface of the base 8, I provide a hollow block or rest 14. This is bolted loosely, as shown at 15, near one end to the base 8. It may be turned laterally as shown in Figs. 1 and 4, or when required as a support it may be positioned longitudinally along the axis of the base, so that the free end comes slightly below the ridge 10. The block is hollow metal, of rectangular cross-section, and has a hole 16 in the top by which it may be turned readily with the dismounting tool.

The opposite end of the base 8 is slotted, as shown at 17, to carry a bolt 18 having a wing nut 18'. An angle bar 19 is loosely carried on the shank of the bolt 18. By this means the angle bar can be made an adjustable abutment for the tire, diametrically away from the point where dismounting is being effected.

The parts above described form a readily transportable but fixed rest for a tire and rim during dismounting. To effect dismounting, I provide a tire tool in the form of a bar 20. This bar may be solid or a hollow pipe, as shown. One end carries a dull chisel point 21 which forms a flat tongue to be inserted in the aperture 12 of the vertical extension 11. The point 21 may be integral with the bar 20 if the latter is solid. Otherwise it may be held in the hollow, tubular handle or bar in any convenient manner.

Spaced back of the point 21, the bar 20 carries a blade 22. This is welded or otherwise firmly attached to the bar. As indicated in the drawings, the blade 22 is in substantially an oblique plane with respect to the axis of the bar 20.

One side of the blade 22 is extended to form finger 23 on the opposite side of the bar. This has an offset or angular tip 24.

The two-part device thus described is useful in dismounting a pneumatic tire from its rim. In the drawings, the tire rim 25 is shown to be of the customary type, having two outer flanges 26, and a central channel 27 which forms a drop-center. As is usual, the tire carcass 28 has side walls 29 terminating in beads 30. The beads 30 rest upon the tire rim inside the flanges 26 and are held in position by the inner tube 31.

In the dismounting operation, the first step is to rest the tire and rim on the base between the vertical extension 11 and the adjusted angle bar 19. In this position, the lower bead 30 of the tire carcass rests upon the ridge 10. At the same time, the block or rest 14 is in the position shown in Figs. 2 and 3, so that it will support the lower flange 26 of the rim 25.

The point 21 of the tool or bar is inserted in the opening 12 as a fulcrum, and the blade 22 forced down between the upper bead 30 and the adjacent rim flange 26. The bead 30 at this point is thus readily separated from the flange and caused to drop below the bottom of the rim into the channel 27. This is illustrated in Fig. 3. The operation is repeated as many times as is necessary to dislodge the entire upper bead 30.

By inverting the tire and rim and rotating the rest 14 a quarter turn, the second bead is also dislodged from the adjacent rim flange and caused to drop into the central channel 27, as indicated in Fig. 4. Optionally, the lower flange of the rim might be supported by the rest 14 during this operation in the same manner as shown in Fig. 3.

Complete separation of the tire carcass from the rim is effected in the manner shown in Fig. 5.

The bar 20 is given a half turn, so that the tongue 23 can be inserted between one bead 30 and the rim. The bead is thus lifted up and over the flange at this point. The operation being repeated at spaced points will separate this bead from the rim. The second bead when brought close to the flange of the opposite side may then be engaged by the tip 24 of the finger 23 and accordingly lifted over the flange in the manner shown in Fig. 5.

Other uses for the device and for the tool will readily suggest themselves, for example the tip 24 of the extension finger 23 is very effective for mounting a bead over a rim, as shown in Fig. 6.

Figure 8:
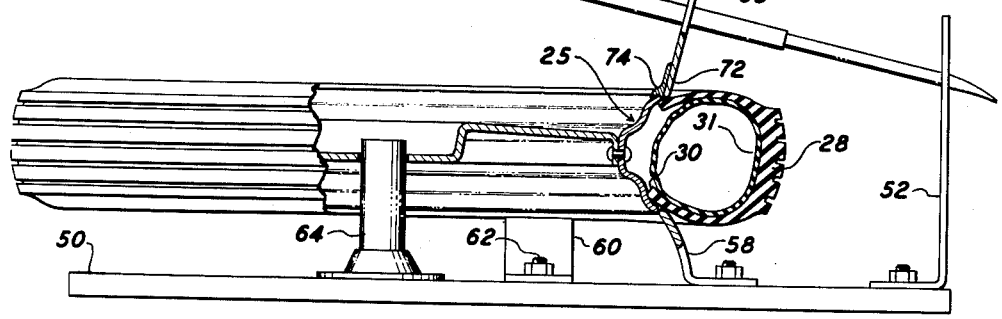
Fig. 8 is an elevation, partially in section, showing the device of Fig. 7 during the initial operation of breaking away one of the beads of the tire from the wheel.
Figure 9:
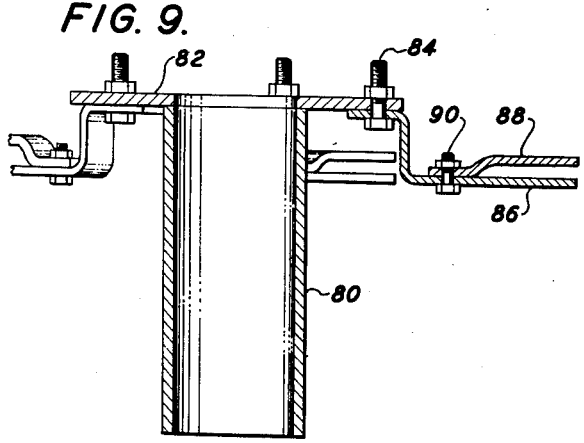
Fig. 9 is a vertical section and Fig. 10 is a plan view of an attachment which is employed in the device shown in Fig. 7 in order to dismount tires which are mounted on a split-rim type wheel.
Figure 10:
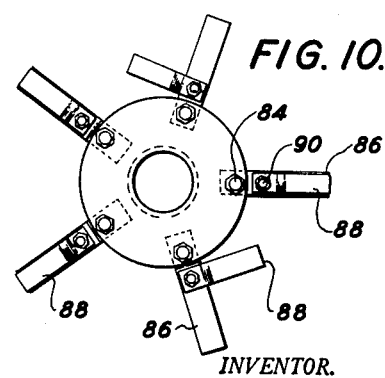

Figs. 7 and 8 show an embodiment of the invention which may be employed to dismount tires which are mounted on conventional wheels with rims having a drop-center, and which may be employed with the attachment shown in Figs. 9 and 10 to dismount tires which are mounted on wheels having a split rim.

A base 50 carries a bracket 52 having a leg which extends approximately vertically. A pair of apertures 54 and 56 are provided in the upper portion of the bracket for accommodating the end of a tire tool of the type shown in Fig. 8.

A smaller bracket 58 provides an upstanding ridge for engaging the lower side wall of the tire. The longitudinal position of the bracket 58 on the base 50 may be adjusted so as to accommodate tires having different diameters.

A raised member 60 is loosely secured to the base by a bolt 62 so that the member 60 can be rotated about the bolt. The member 60 serves as a rest for supporting a tire rim when it is positioned as shown in Fig. 7.

A cylindrical member 64 is rigidly secured to and extends vertically from the base.

The tire tool comprises a bar 66 which carries a blade 68 extending at approximately a right angle with respect to the bar. The end 70 of the blade is curved toward the rear of the bar 66, and the other end 72 carries a projection 74 which provides an opening for accommodating the flange of the wheel on which the tire is mounted.

In order to dismount a tire which is mounted on a conventional rim having a drop-center, the member 60 is positioned as shown in Fig. 8, and the wheel is placed on the device so that the tubular member 64 extends through the central opening in the wheel. The upper end of the bracket 58 is positioned so that it engages the lower side wall of the tire at a location adjacent the rim of the wheel.

Then the forward end of the tire tool is inserted in one of the apertures in the bracket 52 and the blade 68 is positioned as shown in Fig. 8 so that the projection 74 engages the upper rim of the wheel. The rear end of the bar 66 is pushed down so as to break the lower bead of the tire from the rim. It is ordinarily necessary to break the lower bead at more than one location in order to cause all of the bead to separate from the lower flange of the wheel.

In order to break the upper bead of the tire the member 60 is moved to the position shown in Fig. 7 so as to support the rim of the wheel. The bar 66 is then turned so that the end 70 of the blade engages the upper side wall of the tire at a location adjacent the rim of the wheel, and the rear end of the bar 66 is pushed down in order to cause the blade to break the upper bead from the rim. Ordinarily the upper bead must be broken from the rim in more than one place in order to cause the bead to lie in the drop-center of the wheel.

When both beads are in the drop-center of the rim of the wheel, the tire may be removed in a conventional manner, either by using the tire tool shown in Fig. 8 or by using any other suitable tool.

Figure 11:
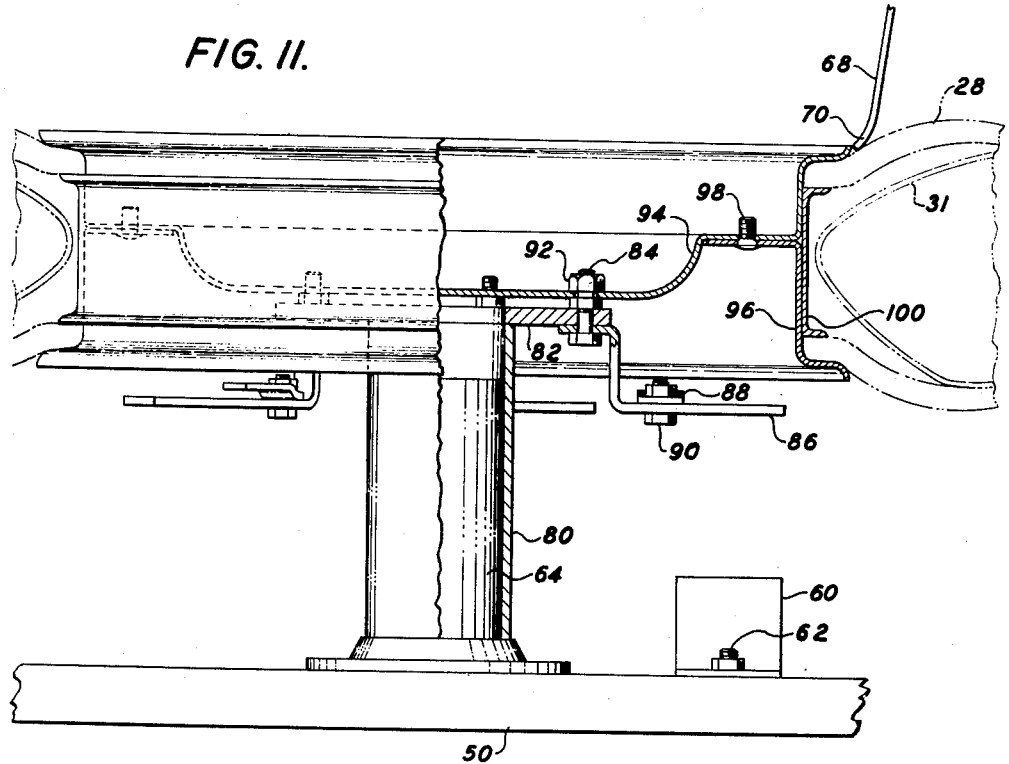
Figs. 11 and 12 are elevations, partially in section, showing the use of the attachment shown in Figs. 9 and 10 for dismounting tires which are mounted on a split-rim type wheel.
Figure 12:
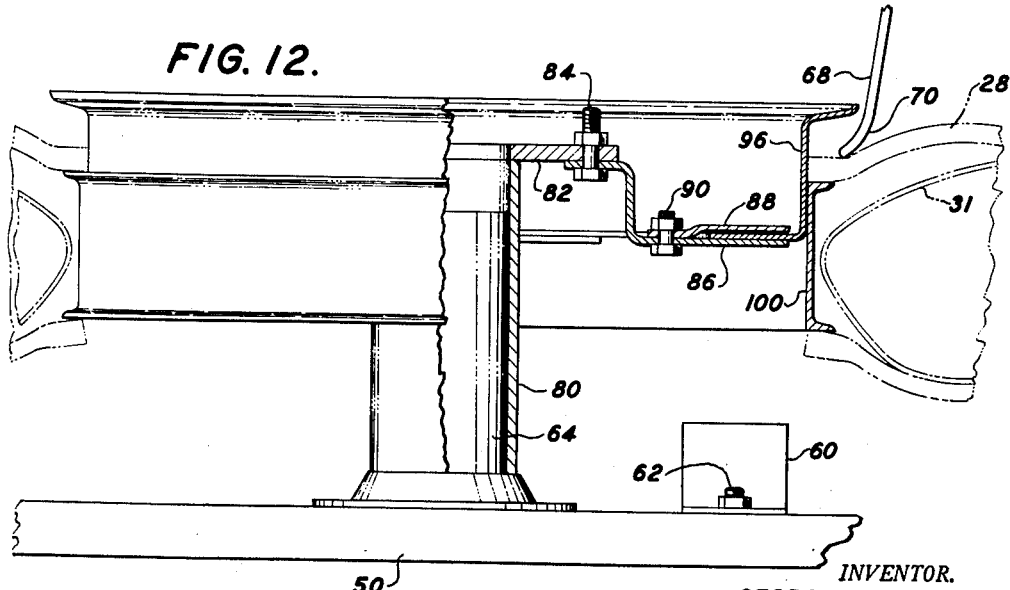

In order to dismount tires which are mounted on split-rim type wheels, the attachment shown in Figs. 9 and 10 is rotatably mounted on the cylindrical member 64, as shown in Figs. 11 and 12.

The attachment comprises a tubular member 80 having a plate 82 secured to one end of the member. The plate carries a plurality of bolts 84 which correspond in number and location to the openings in the wheel which are provided to join the wheel to a vehicle.

A plurality of radially extending brackets 86 are secured to the plate 82 by the bolts 84. The brackets 86 are provided with movable fingers 88 which are loosely secured to the brackets by bolts 90.

With the attachment installed, the split-rim type wheel is first mounted on the apparatus as shown in Fig. 11. The bolts 84 extend through the openings in the wheel which are provided for securing the wheel to a vehicle, and the wheel is secured to the device by one or more nuts 92.

The split-rim type wheel comprises a portion 94 which is ordinarily attached to a vehicle, and a portion 96 which is attached to the portion 94 by a plurality of bolts 98. A spacer 100 is located between the flanges on the portions 94 and 96, and the spacer serves to force the beads of the tire 28 against the flanges of the wheel when nuts on the bolts 98 are tightened.

With the split-rim type wheel mounted as shown in Fig. 11, the nuts are removed from the bolts 98. The bar of the tire tool is then inserted into one of the slots of the bracket 52 (not shown), and the end 70 of the blade of the bar is pressed down so as to cause the tire 28, the spacer 100, and the portion 96 of the wheel to drop down so that the portion 96 of the wheel rests upon the brackets 86.

The portion 94 of the wheel is then removed, and the portion 96 of the wheel is turned over and secured on the brackets 86 by one or more of the fingers 88, as shown in Fig. 12.

The tire is then separated from the portion 96 of the wheel by forcing the end 70 of the blade of the tire tool down as shown in Fig. 12 so that the tire 28 and the spacer 100 drop to the base 50.

The portion 96 of the wheel is removed from the device, and the dismounted tire 28 and spacer 100 are lifted from the dismounting device. Then the spacer 100 is removed by hand so that the tire is completely separated from the wheel and the spacer 100.

I claim:

1. A tire dismounting device comprising an elongated base, an extension projecting approximately vertically from the base adjacent one end thereof, the extension having at least one aperture therein extending through the extension along an axis aligned with the length of the base and spaced from the upper end of the extension, an upstanding ridge located on the base and spaced from the vertical extension, a pivoted rest located on the base adjacent the ridge for supporting a tire rim, and means on the base for supporting a wheel having a tire thereon so that the upstanding ridge engages a portion of the tire adjacent the rim of the wheel.

2. The device of claim 1, further including an elongated bar having an end adapted to seat in the aperture in the vertical extension and having a blade affixed to the bar extending transversely with respect to the longitudinal axis of the bar.

3. A tire dismounting device comprising an elongated base, an extension projecting substantially vertically from the base adjacent one end thereof, the extension having at least one aperture therein with the axis of the aperture extending along the length of the base so that a bar can be inserted into the aperture with the bar extending longitudinally along the length of the base, a cylindrical member extending substantially vertically and located on the base at a position spaced longitudinally along the base from the extension, and an upstanding ridge located on the base intermediate the extension and the cylindrical member.

4. A tire dismounting device comprising an elongated base, a bracket connected to the base adjacent one end thereof and having a leg which extends substantially vertically from the base, the vertically extending leg having at least one aperture therein extending through the extension along an axis extending along the length of the base with the extension providing a rigid surface at the upper side of the aperture, a cylindrical member extending substantially vertically and located on the base at a position spaced longitudinally along the base from the extension, an upstanding ridge located on the base intermediate the vertically extending leg of the bracket and the cylindrical member for engaging the bead of a tire, a pivoted rest located on the base adjacent the ridge for supporting a tire rim, and an elongated bar having an end adapted to seat in the aperture in the leg of the bracket and having a blade affixed to the bar extending transversely with respect to the longitudinal axis of the bar.

5. A tire dismounting device comprising an elongated base, an extension projecting approximately vertically from the base adjacent one end thereof, the extension having at least one aperture therein extending through the extension along an axis extending along the length of the base with the extension providing a rigid surface at the upper side of the aperture, a cylindrical member extending substantially vertically and located on the base at a position spaced longitudinally along the base from the extension, an elongated bar having an end adapted to seat in the aperture in the vertical extension with the bar extending longitudinally along the length of the base, the bar having a blade affixed to the bar extending transversely with respect to the longitudinal axis of the bar, a tubular member rotatably mounted on the cylindrical member, a plate affixed to the upper end of the tubular member, at least one bolt having a threaded end extending vertically from the upper surface of the plate, and at least one arm supported by and extending away from the tubular member at a location below said bolt.

References Cited in the file of this patent

UNITED STATES PATENTS

| Number | Name | Date |
|---|---|---|
| 1,156,167 | Mills | Oct. 12, 1915 |
| 1,538,875 | Stevens | May 19, 1925 |
| 1,742,590 | Freivogel | Jan. 7, 1930 |
| 1,776,804 | Blaeser | Sept. 30, 1930 |
| 1,793,863 | Manley | Feb. 24, 1931 |
| 1,937,833 | Mondloch | Dec. 5, 1933 |
| 2,212,768 | Bonneau | Aug. 27, 1940 |
| 2,290,887 | Martin | July 28, 1942 |
| 2,489,088 | Hewitt | Nov. 22, 1949 |
| 2,501,225 | Kuhlmann | Mar. 21, 1950 |
| 2,523,979 | Weeks | Sept. 26, 1950 |